United States Patent [19]

Klumpp et al.

[11] Patent Number: 4,734,742
[45] Date of Patent: Mar. 29, 1988

[54] DUPLEX SCANNER

[75] Inventors: Robert C. Klumpp, Holcomb; Frederick B. Messbauer, Rochester; Donald C. Buch, Penfield, all of N.Y.

[73] Assignee: Eastman Kodak Company, Rochester, N.Y.

[21] Appl. No.: 933,663

[22] Filed: Nov. 21, 1986

[51] Int. Cl.$^4$ .............................................. G03B 27/32
[52] U.S. Cl. .................................................... 355/23
[58] Field of Search ................... 355/23, 24, 25, 8, 11

[56] References Cited

U.S. PATENT DOCUMENTS

| | | | |
|---|---|---|---|
| 3,637,302 | 1/1972 | Hunt et al. | 355/8 |
| 3,885,871 | 5/1975 | Galatha | 355/23 |
| 3,936,171 | 2/1976 | Brooke | 355/23 |
| 3,980,406 | 9/1976 | Lang | 355/24 |
| 3,981,580 | 9/1976 | Yamashita | 355/24 |
| 4,110,030 | 8/1978 | Knechtel | 355/24 |
| 4,247,192 | 1/1981 | Komori et al. | 355/23 |
| 4,261,661 | 4/1981 | Thiers | 355/24 |
| 4,506,301 | 3/1985 | Kingsley et al. | 358/280 |
| 4,571,636 | 2/1986 | Itoh | 355/23 X |
| 4,616,269 | 10/1986 | Mori | 355/7 |
| 4,673,285 | 6/1987 | Shogren | 355/23 |

FOREIGN PATENT DOCUMENTS

| | | | |
|---|---|---|---|
| 153964 | 12/1980 | Japan | 355/8 |
| 123833 | 7/1984 | Japan | 355/8 |
| 70436 | 4/1985 | Japan | 355/8 |

OTHER PUBLICATIONS

Xerox Disclosure Bulletin, vol. 8, No. 3, May/Jun. 1983, p. 263.

Primary Examiner—Donald A. Griffin
Attorney, Agent, or Firm—Leonard W. Treash

[57] ABSTRACT

An electrooptical scanner includes an optical system having mirrors for directing light from one side of a document through a lens to a charge coupled device and from the other side of the document through the same lens to a different charge coupled device. The scanner scans both sides at the same time using a straight paper path.

7 Claims, 3 Drawing Figures

DUPLEX SCANNER

This invention relates to optical scanners, and more specifically to a scanner capable of projecting images of opposite sides (duplex) of a document sheet onto electrooptical sensing means.

The output of optical scanners is used by a variety of types of devices, of which printers is only one. Although the problem giving rise to this invention is described in terms of a copier (a printer plus a scanner), the invention is usable in other applications of scanners as well.

Copiers presently on the market automatically expose opposite sides of a document by turning the document over between exposures at the same exposure station. The turnover mechanism is expensive, is a source of paper jams and can be the speed limiting aspect of an entire copying system.

U.S. Pat. Nos. 4,261,661, 4,247,192, and 3,980,406 show optical systems in which narrow line images of opposite sides of a moving document are sequentially projected onto moving light-sensitive material from exposure stations that are separate for the opposite sides. At least partially separate stationary optics are used for the respective stations, but document turnover or similar mechanisms are nevertheless employed. In several such systems a portion of the optical system is also movable for scanning a stationary object such as a book.

U.S. Pat. No. 3,936,171 shows a copier in which images of opposite sides of a document are projected virtually simultaneously using a straight through paper path. The images are projected by entirely separate optics onto separate photoconductive imaging drums. This system offers an increase in speed and a straight through paper path at the expense of an extra copying drum and accessories.

U.S. Pat. No. 3,885,871 shows an optical system for imaging opposite sides of serially fed documents onto film using two sets of mirrors and a single lens.

Optical exposing systems such as these are being replaced in copying by electrooptical scanning devices in which an electrooptical element having separately electronically addressable image sensing pixels, such as a linear CCD (charge-coupled device) receives a line scan of a document to create an electronic signal representative of the document. See, for example, U.S. Pat. No. 4,506,301. With such systems, ordinary duplex scanning would involve turning the document over between scans.

It is an object of this invention to provide a scanner of the type having a linear CCD or other similar electrooptical sensor which scanner is capable of scanning both sides of a given document without turning the document over.

This object is accomplished by a duplex scanner having means for directing scanning illumination along first and second optical paths from opposite sides of a document onto separate electrooptical sensors.

With separate sensors, both sides of the document can be scanned at the same time, greatly increasing speed as compared with consecutively scanning each side with the same sensor.

An advantage of scanning the opposite sides of the same document with at least partially separate optics is that the document does not have to be turned over. This eliminates the necessity of a costly turnover mechanism, reduces paper handling and paper jams. According to a preferred embodiment of the invention, the document is fed along a "straight through" paper path, with path lends itself to low cost and reliability.

According to another preferred embodiment of the invention, the optical system directs the images back through the same lens to the sensors, each located in an image plane of the lens. The advantage of using the same lens while doing such duplex scanning is that you save the substantial added expense of a separate lens for each side.

According to another preferred embodiment of the invention, the lens has an optical axis generally orthogonal to the direction of travel of the documents being scanned and lying in a plane generally parallel to the document itself. This construction lends itself to compactness and to a minimum of reflecting surfaces.

According to another preferred embodiment of the invention the second optical path, the lens and at least one sensor are movable for scanning a stationary object, for example, a book placed on an exposure platen.

According to another preferred embodiment of the invention a third electrooptical sensor is placed in the image plane of the lens and a third optical path is provided from a location on the path of movement of the document to that third sensor to monitor the orientation and thereby detect any skew in the document as fed. Such detection can be used to signal an operator or to actuate a mechanical mechanism for correcting for such skew.

Figure 1:
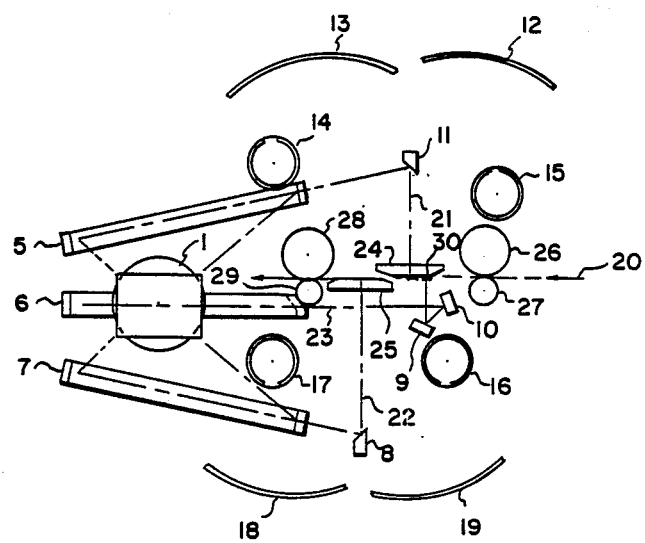
FIGS. 1 and 2 are schematic front and side views respectively of a duplex scanner constructed according to the invention.
Figure 2:
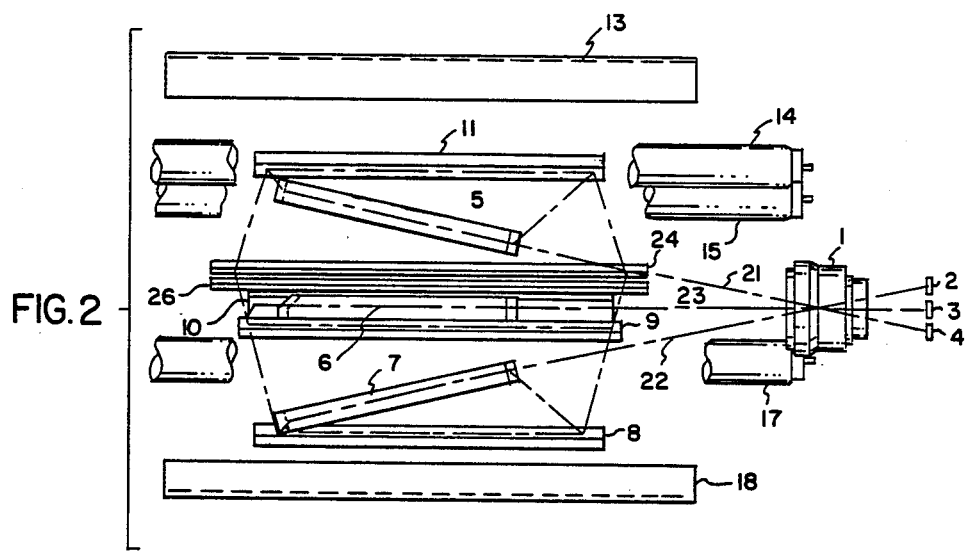

According to FIGS. 1 and 2, a lens 1 has an image plane containing three electrooptical image sensors having separately electronically addresable pixels, for example, linear CCD's 2, 3 and 4. CCD 2 receives light directed from a first exposure station 25 along a first optical path 22 by mirrors 7 and 8. Exposure station 25 includes lamps 16 and 17 cooperating with reflectors 18 and 19.

CCD 4 receives light directed from a second exposure station 24 along a second optical path 21 by mirrors 5 and 11. Exposure station 24 includes lamps 14 and 15 cooperating with reflectors 12 and 13.

First and second exposure stations 25 and 24 are oriented so that images of opposite sides of a received document are projected at substantially the same time by lens 1 on CCD's 2 and 4. Optical paths 21 and 22 therefore project in generally opposite directions from the document and then are folded by mirrors 5, 7, 8 and 11 back through lens 1.

CCD 3 receives light along a light path 23 directed by mirros 6, 9 and 10 from a position 30 near exposure stations 25 and 24 through the lens 1.

In operation a document is fed along a document path 20 by rollers 26, 27, 28 and 29 past position 30 and exposure stations 24 and 25. As the document passes exposure station 25, an image of the bottom side of the moving document is projected onto CCD 2. As the document passes exposure station 24, an image of the top side of the document is projected onto CCD 4. As the document passes point 30, the orientation of the front edge of the document is sensed by CCD 3. The mirrors are arranged so that all the light paths are directed through lens 1 with lens 1 oriented with its optical axis substantially orthogonal to the direction of motion of the document and lying in a plane roughly parallel to the document itself. This provides a very compact arrangement for scanning both sides of the document at substantially the same time with a minimum of reflecting surfaces, and with substantial cost savings associated with using the same lens.

The use of separate sensors 2 and 4 allows both sides of the document to be scanned at the same time. This essentially doubles the output of an ordinary scanner which would scan the two sides consecutively onto the same sensor, even assuming any document turn around time can be eliminated in the latter structure. The output of the sensors are electronic signals which can be fed into separate memories and read out by a printer, a facsimile apparatus, a computer terminal or the like. If both the scanner and, for example, a printer are executing the same job at the same time, using a one page buffer, the printer can operate at twice the speed of the document feed portion of the scanner.

Thus, this scanner at least doubles the speed of an ordinary scanner at the cost of several reflecting surfaces and an extra linear CCD. The cost of the latter has become a small fraction of its cost a few years ago.

This structure also has the advantages associated with a straight through paper path of greatly reducing the problems associated with paper jams and the expense associated with turnover mechanisms and the like. Thus, the invention provides increased reliability as well as reduction in parts.

Figure 3:
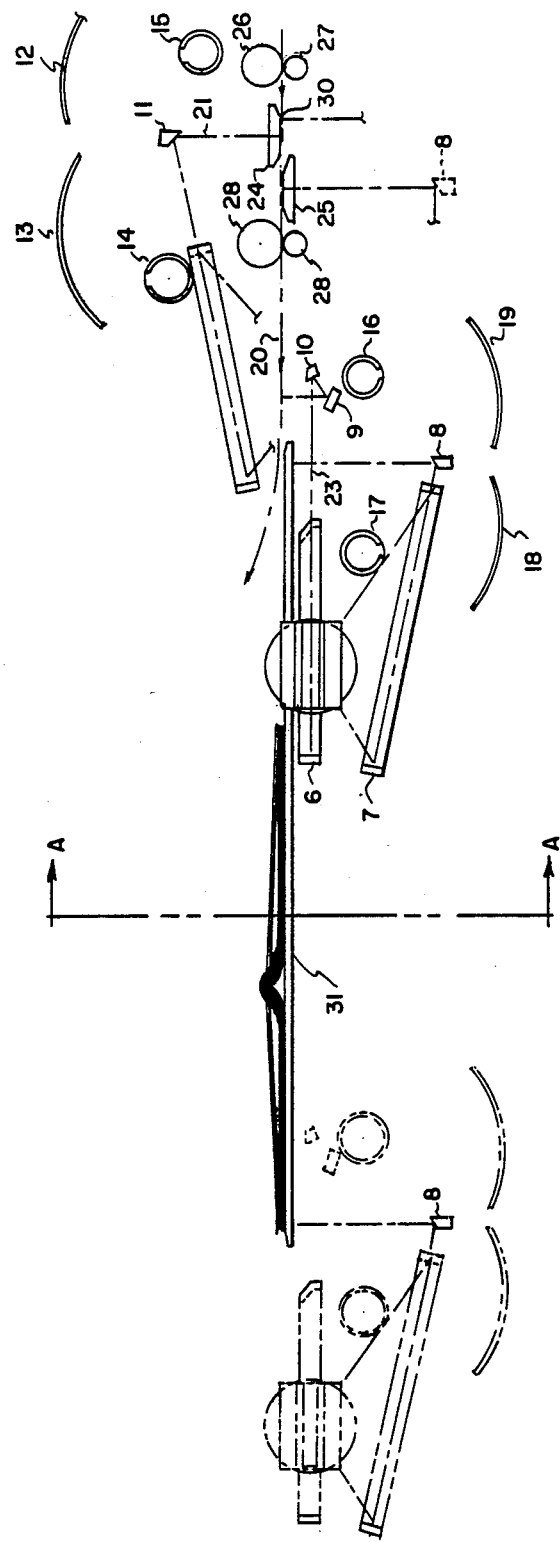
FIG. 3 is a schematic front view of another embodiment of the invention in which an optical system for scanning a stationary object such as a book is added to the duplex scanner shown in FIGS. 1 and 2.

FIG. 3 shows the same optical system as FIGS. 1 and 2 with the added feature that mirrors 6, 7, 8, 9 and 10, lens 1, illumination lamps 16 and 17, reflectors 18 and 19 and CCD's 2, 3 and 4 are all movable together to scan a stationary document or object, for example, a book placed on an exposure platen 31.

In the FIG. 3 embodiment, the elements defining optical path 23 are also movable, reading the first edge encountered in the scanning process, the right edge of the book shown in FIG. 3.

The location of the lens in a direction orthogonal to the direction of movement of the document again allows easy access to light paths from opposite sides of the document while providing clearance between the document and those optical paths. In the FIG. 3 embodiment, this lens orientation permits movement of a portion of that optical system without also interfering with the stationary document.

CCD 3 senses the skew of the document in both the FIGS. 1 and 2 embodiment and the FIG. 3 embodiment. In the FIGS. 1 and 2 embodiment this can be used to mechanically correct for such skew as is well known in the art, see, for example, U.S. Pat. No. 4,310,236. In both embodiments the output of CCD 3 can be used to electronically correct for the skew by electronically rotating the document by the use of appropriate logic, see, for example, U.S. Pat. No. 4,558,461. The output of CCD 3 can also be used to signal the operator that there is a skew in the document.

The invention has been described in detail with particular reference to a preferred embodiment thereof, but it will be understood that variations and modifications can be effected within the spirit and scope of the invention as described hereinabove and as defined in the appended claims.

We claim:

1. A duplex scanner having:
   a lens;
   first and second exposure stations positioned to receive a document with the stations facing opposite sides of a document so received;
   means for directing light from one side of a received document at the first station along a first optical path through said lens to a first electrooptical sensor in an image plane of the lens, and for directing light from the other side of the document at the second station along a second optical path through said lens to a second electrooptical sensor in an image plane of the lens, said electrooptical sensors being of the type having separately electronically addressable image sensing picture elements; and
   means for effecting relative movement between the light directing means and a received document.

2. A duplex scanner according to claim 1 wherein the exposure stations, in at least one mode of operation, are stationary and the means for effecting relative movement includes means for feeding a document along a generally straight line document path located between the stations.

3. A duplex scanner according to claim 2 having a second mode of operation in which the portion of said light directing means which directs light along said second optical path, said lens and said second electrooptical sensor are movable as a unit to traverse a stationary object to direct light from such stationary object to said second sensor.

4. A duplex scanner according to claim 1 wherein the lens is oriented with its optical axis generally orthogonal to the direction of relative movement between the exposure stations and a received document.

5. A duplex scanner according to claim 4 wherein the lens is orineted with its optical axis in a plane generally parallel to a received document.

6. A scanner having at least one exposure station, means for directing light from one side of a document received by said exposure station through a lens to an electrooptical sensor, means for feeding a document along a document feed path past said exposure station, and means for directing light along a skew sensing optical path from a position along the path of movement of a document through the lens to a skew sensing electrooptical sensor in an image plane of the lens to monitor the orientation of the leading edge of a document fed along said document feed path.

7. A duplex scanner having:
   a lens;
   first and second exposure stations positioned to receive a document with the stations facing opposite sides of a document so received;
   means for directing light from one side of a received document at the first station along a first optical path through said lens to a first electrooptical sensor in an image plane of the lens, and for directing light from the other side of the document at the second station along a second optical path through said lens to a second electrooptical sensor in an image plane of the lens;
   means for feeding a document along a generally straight line document path located between the stations; and
   means for directing light along a third optical path from a position along the path of movement of a document, through the lens to a third electrooptical sensor in an image plane of the lens to monitor the orientation of the leading edge of a document fed along said document path.

* * * * *